United States Patent

Loreck et al.

[11] Patent Number: 5,309,314
[45] Date of Patent: May 3, 1994

[54] CIRCUIT CONFIGURATION FOR ACTUATING A SAFETY RELAY

[75] Inventors: Heinz Loreck, Frankfurt/am Main; Michael Zydek, Langgoens/Cleeberg; Hermann Esselbruegge, Weiterstadt, all of Fed. Rep. of Germany

[73] Assignee: Alfred Teves GmbH, Frankfurt am Main, Fed. Rep. of Germany

[21] Appl. No.: 558,958

[22] Filed: Jul. 27, 1990

[30] Foreign Application Priority Data

Jul. 28, 1989 [DE] Fed. Rep. of Germany ....... 3924988

[51] Int. Cl.⁵ ............................................ H03K 17/18
[52] U.S. Cl. ................................... 361/160; 361/187; 363/53; 363/56
[58] Field of Search ........................ 361/160, 18, 187; 303/20, 92, 97; 323/279; 363/53, 56

[56] References Cited

U.S. PATENT DOCUMENTS 5,004,970  4/1991  Barou .................... 323/277

FOREIGN PATENT DOCUMENTS 2612356  9/1977  Fed. Rep. of Germany .
3246385  6/1984  Fed. Rep. of Germany .
2345321 10/1977  France .
1576072 10/1980  United Kingdom .
2127507  4/1984  United Kingdom .

*Primary Examiner*—A. D. Pellinen
*Assistant Examiner*—Aditya Krishnan
*Attorney, Agent, or Firm*—Dykema Gossett

[57] ABSTRACT

A circuit configuration for actuating a safety relay (1) such as the main relay of an electronically controlled brake system of an automotive vehicle at least has two transistors (T1, T2) connected in series and a monitoring circuit (5) which will urge the transistors into the non-conductive state if there is a defect or trouble. The operativeness of the transistors (T1, T2) or of the monitoring circuit (5) will cause the safety relay (1) to be switched off.

5 Claims, 2 Drawing Sheets

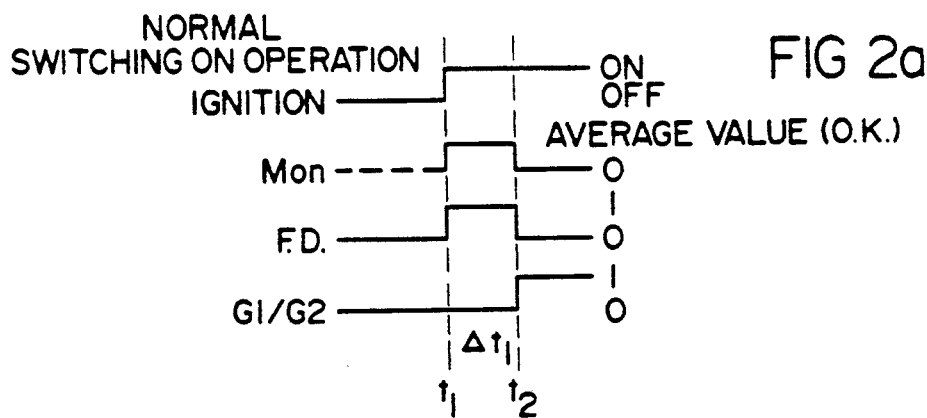
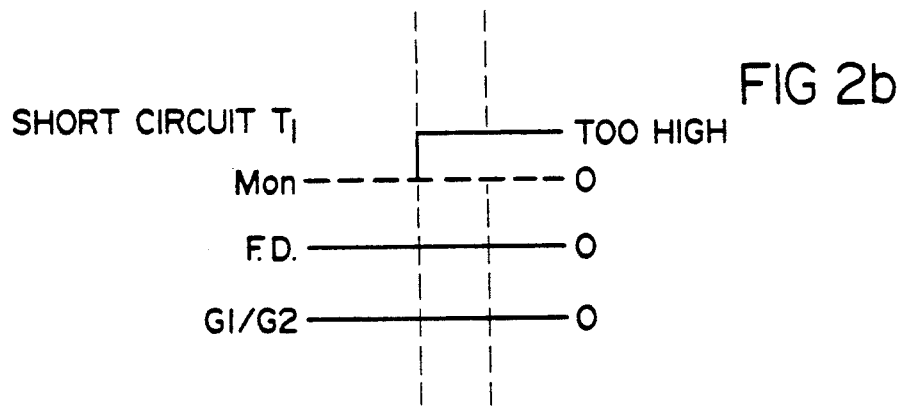
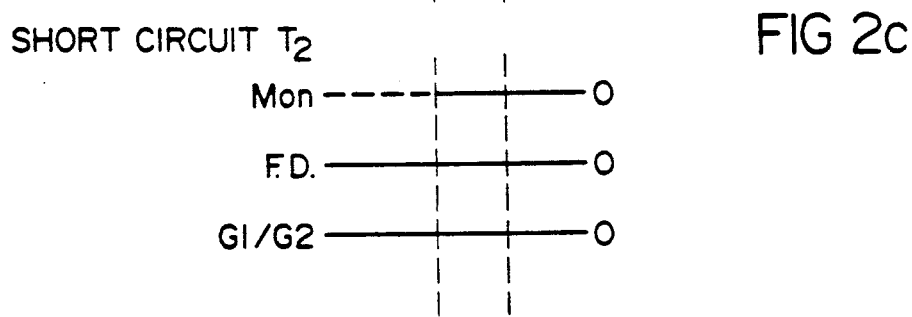
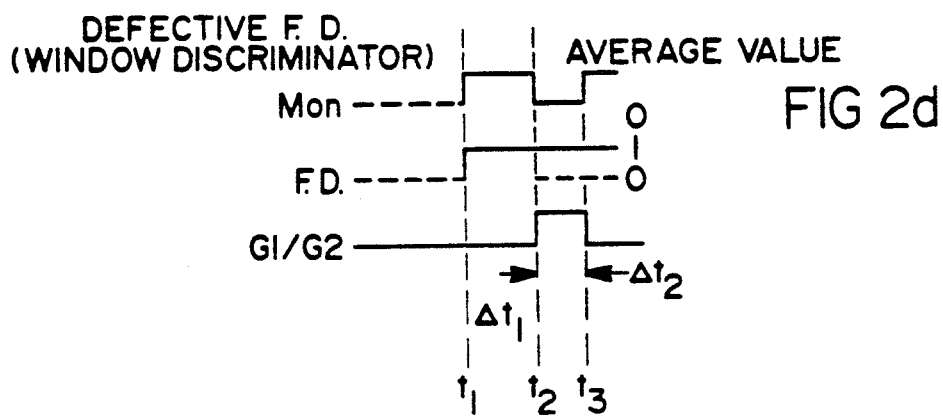

CIRCUIT CONFIGURATION FOR ACTUATING A SAFETY RELAY

BACKGROUND OF THE INVENTION

This invention relates to a circuit configuration for actuating a safety relay such as the main relay or power supply relay of an electronically controlled brake system of an automotive vehicle. At least two electronically operable switches, particularly transistors connected in series are provided with a monitoring circuit which interrupts the power supply of the safety relay by actuating the switches if there is a defect.

An anti-lock-controlled brake system of this type is disclosed in German Patent (DE-PS) No. 26 12 356 (corresponding with U.S. Pat. No. 4,133,321) and in German Published Patent Application (DE-OS) No. 32 34 637 (corresponding to U.S. Pat. No. 4,546,437). The respective brake systems are arranged to ensure after the safety relay has switched off or has dropped out, all braking pressure control valves adopt or maintain their rest positions in which uncontrolled braking operations are possible without restrictions. Thus, defects in the electronic system cannot put the brake out of operation. It therefore must be ensured that it is possible to switch off the main relay which is important for the operation of the brake and, therefore, for the safety of the vehicle. Therefore, at least two transistors connected in series are inserted into the power supply path of the safety relay or main relay so as to maintain the safety function by means of the second transistor even in case of failure or of a blow-out of the other transistor.

By means of the two or more transistors connected in series it is achieved that it will be possible to switch off the safety relay even if one of the two switches will remain conductive permanently, such a defect, however, is not detectable although there does not exist any longer the safety stand-by function intended by the redundant arrangement of the switches.

It is thus an object of the present invention to eliminate this disadvantage and to provide a circuit configuration for actuating a safety relay which also will allow the failure of a redundant switch to be detected.

BRIEF DESCRIPTION OF THE DRAWING

It now has been found that this object is achieved by means of a circuit configuration of the type referred to at the beginning whose particular characteristic consists in that the operativeness of the switches and of the monitoring circuit can be checked at regular intervals or at regularly repeating incidents such as the time when the ignition of an engine of an automotive vehicle is switched on.

Thus, according to this invention, the monitoring reliability provided by the connection in series of a plurality of switches out of which anyone is able to switch off the safety relay in case of trouble will be maintained even if anyone of the redundant components becomes defective. The defect will be indicated and, with an anti-lock control system, control will be caused to switch off and the braking function will be ensured.

Figure 1:
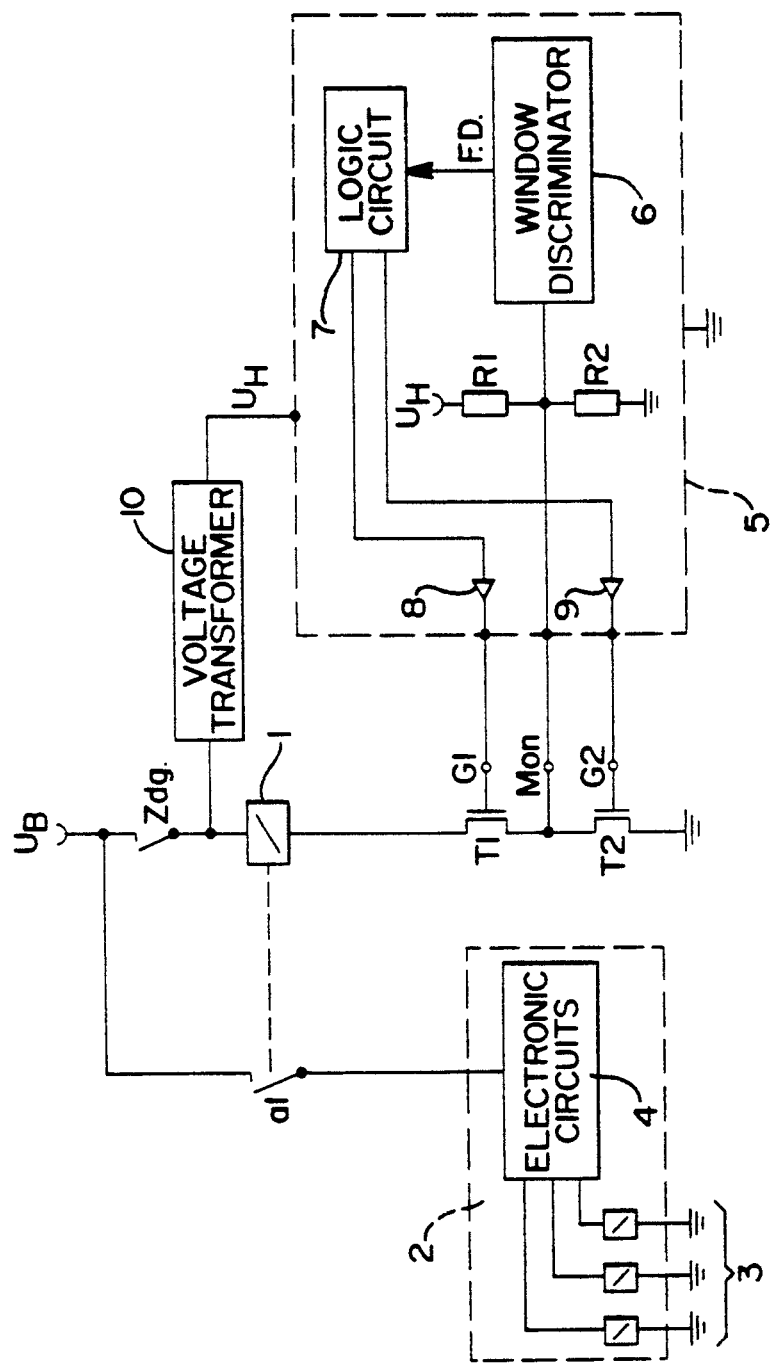

According to an advantageous embodiment of this invention, the switches can be checked for the conductive or non-conductive state independently of each other during any checking operation. The safety relay will be switched on only if both switches are operative.

According to a further embodiment, the monitoring circuit has a voltage divider which is connected to the switches, connected in series, in such a manner as to ensure that, during the checking operation, at a monitoring point of the voltage divider there will appear an average value if the switches operate properly and that there will appear an upper or lower limit value in case of a short circuit of either switch.

Advantageously, the adherence to the average value can be detected by means of a window discriminator connected to the monitoring point, via an evaluation logic the output signal of said window discriminator actuating the switches, if there is no defect, and thereby switching on the safety relay.

BRIEF DESCRIPTION OF THE DRAWING

Further characteristics, advantages and applications of the present invention will become more apparent from the following detailed description of an embodiment, when taken in conjunction with to accompanying drawing of variations in various situations, wherein:

FIG. 1 is a simplified representation of a circuit configuration according to the present invention; and, FIG. 2 is the signal variation of the circuit configuration of FIG. 1, wherein:

FIG. 2a as in FIG. 1 with the system intact;

FIG. 2b with a short circuit of transistor T1 in FIG. 1;

FIG. 2c with a short circuit of the other transistor as per FIG. 1; and,

FIG. 2d with a defective window discriminator.

DETAILED DESCRIPTION

The illustrated circuit configuration is provided for switching on and off the so-called main relay 1 of an electronically controlled anti-lock control system. The main relay 1 is connected via two transistors T1, T2 connected in series $U_B$ symbolizes the supply voltage, namely the battery voltage of a vehicle. A normally open contact a1 of this safety relay, or rather main relay, switches on and off the supply voltage for the electronic control unit 2 of the anti-lock control system, inclusively of the electromagnetically operable braking pressure control valves 3 actuated by the control unit. Reference numeral 4 symbolizes the electronic circuits of control unit 2.

The switches, or rather the switching transistors T1, T2, which in this case have the design of field effect transistors are regularly checked for their operativeness by means of a monitoring circuit 5 and switched by it into the conductive state if there is no defect or trouble.

The monitoring circuit 5 comprises a window discriminator 6, a logic circuit 7 and two amplifier stages 8, 9 by way of which the gates G1, G2 are actuated by the output signals of the logic 7. The power supply of the monitoring circuit 5 takes place via an auxiliary voltage $U_H$ of, e.g., 5 volts diverted from the supply voltage $U_B$ (which generally is approximately 12 V) by means of a voltage transformer 10.

Belonging to the monitoring circuit 5 is also a voltage divider consisting of two resistors R1, R2 connected in series. Said voltage divider is connected to the auxiliary voltage $U_H$, the ground and to the so-called monitor connection Mon. The window discriminator 6 measures the potential prevailing at the monitor connection Mon. The value of the potential, or rather its change in dependence on the actuation of the transistors T1, T2, will allow conclusions with regard to the operativeness of the transistors T1, T2 as will be explained subsequently with reference to FIG. 2.

The safety relay 1 is connected to the vehicle battery, that is to the voltage source $U_B$, by way of a normally open relay contact Zdg belonging to the ignition lock of an automotive vehicle.

The inventive circuit configuration operates as follows:

During a normal switching-on operation—see FIG. 2a—at first both transistors $T_1$, $T_2$ are high-impedance or rather non-conductive after switching-on of the ignition at time $t_1$. Since the two resistors R1, R2 are equal (approximately) half of the auxiliary volta $U_H$ can be measured on the connection line Mon. The window discriminator 6 signalizes to the logic 7 whether the voltage on line Mon is between, for instance, 2 volts and 3 volts—then, both transistors are non-conductive—or whether this condition is not complied with. If this condition is not complied with it will be signalized by respectively "L" or "O". This condition being complied with, this will be signalized by "H" or "1". If a "1" appears at the output F.D. of the window discriminator 6 the logic 7 will actuate and switch the transistors T1, T2 into the conductive state at time $t_2$, i.e., after a predetermined period delta $t_1$. Thereby, the potential at the monitor connection Mon will sink to "O" as the, now, low-impedance transistor T2 bridges the parallel resistor R2 of the voltage divider. This change in potential in connection line Mon again will induce the output signal F.D. of the window discriminator 6 to change over from 1 to 0.

A transistor being defective, the signal variation just described will change. For instance, if transistor T1 has short-circuited so that it is "conductive" or rather low-impedance even without any actuating signal—see FIG. 2b—the potential on connection line Mon will be "too high" after the closing of the ignition switch contact Zdg. Consequently, the output signal of the window discriminator or Fensterdiskriminator (hereinafter "F.D." 6 will stay O and, thus, there will be no actuation of the gate electrodes G1, G2 of the transistors T1, T2 by means of the logic 7. Switching-on of the safety relay 1 and, hence, of the power supply via contact a1 of the electronic control unit 2 will be prevented.

In the event of a short circuit of transistor T2 the potential on monitor line Mon will continue to be so low, even after the ignition has been switched on, that again any change in signal will be impossible at the output F.D. of the window discriminator 6. FIG. 2c shows the signal variation of this defective condition.

The inventive circuit configuration likewise allows a trouble in the window discriminator 6 to be detected. FIG. 2d relates to a possible defective reaction of the window discriminator. IN this example there will permanently prevail the output signal "1" at the output F.D. of the window discriminator 6 after the supply voltage $U_H$ has been switched on. At time $t_2$, therefore, the logic 7 at first will actuate and switch on both transistors T1, T2. However, as after this switching-on at time $t_2$, the change in potential to be expected at output F.D. of the window discriminator 6 will not come about the actuation of the transistors T1, T2 will be terminated again, thereby the safety relay 1 being switched off, at time $t_3$, i.e., after period delta $t_2$.

If there permanently prevails the output signal 0 at the output F.D. because of a defect of the discriminator 6 there will be no actuation of the transistors T1, T2. The relay 1 will not be switched on.

Thus, not only is a defect in the switches or transistors T1, T2 is indicated but also a defect or problem in the monitoring circuit 5, as a result of this finding the safety relay being switched off.

What is claimed is:

1. A circuit configuration for actuating a safety relay such as the power supply relay of an electronically controlled brake system of an automotive vehicle, with at least two electronically operable switches, connected in series and with a monitoring circuit, including a window discriminator, operative to sense voltage at a point of common connection between said switches, and a feedback path between said monitoring circuit and said switches for providing a control signal to said switches, said monitoring circuit operative to interrupt the power supply of the safety relay by actuating the switches by way of said feedback path in response to a circuit malfunction, wherein the operativeness of the switches and of the window discriminator is checked at regular intervals or at regularly repeating incidents such as each time the ignition of an engine of an automotive vehicle is switched on.

2. A circuit configuration as claimed in claim 1, wherein the switches can be checked for the conductive or non-conductive state during any checking operation.

3. A circuit configuration for actuating a safety relay such as the power supply relay of an electronically controlled brake system of an automotive vehicle, with at least two electronically operable switches connected in series and with a monitoring circuit, including a window discriminator, which interrupts the power supply of the safety relay by actuating the switches in response to a circuit malfunction, and an evaluation logic circuit electrically coupled to said window discriminator and said switches for providing a control signal in response to the output state of said window discriminator wherein the operativeness of the switches and of the window discriminator is checked at regular intervals or at regularly repeating incidents such as each time when the ignition of an engine of an automotive vehicle is switched on, wherein said monitoring circuit has a voltage divider which is connected to the switches, connected in series, in such a manner as to ensure that, during the checking operation, at a monitoring point of the voltage divider there will appear an average value if the switches operate properly and that there will appear an upper or a lower limit value in case of a short circuit of either switch, and in that the adherence to the average value can be detected by means of the window discriminator connected to the monitoring point, via said evaluation logic the output signal of said evaluation logic actuating the switches in case of a proper performance of the checking operation and thereby switching on the safety relay.

4. A safety relay actuation circuit comprising:
a plurality of electronically operable switches series connected with a safety relay and a source of electrical potential to establish a safety relay actuation current flow path, said switches defining a monitoring point at a common connection therebetween; and
a monitoring circuit operative to actuate at least one of said switches in response to a circuit malfunction to interrupt said current flow path, said monitoring circuit including window discrimination means operative to sense voltage potential at said monitoring point and generate an output signal as a function of the difference between said voltage potential and a reference voltage, said monitoring circuit further including logic means electrically coupled between said window discriminator means and said switches forming a feedback path for sending a test signal to said switches along said feedback path and for monitoring the output of said window discrimination means in response to said test signal and for sending a switch control signal to said switches along said feedback path based on the output of said window discrimination means.

5. A circuit for actuating a safety relay, comprising:
at least two electronically operable switches connected in series with said safety relay and a source of electrical potential, said switches defining a monitoring point at a common connection therebetween;

testing means electrically coupled to said switches for sending a test signal to said switches;

sensing means electrically coupled to said monitoring point for sensing the responses of said switches to said test signal; and logic means electrically coupled between said sensing means and said testing means for disabling said switches if said responses of said switches are incorrect.

* * * * *